United States Patent
Jung et al.

(10) Patent No.: US 9,357,461 B2
(45) Date of Patent: May 31, 2016

(54) METHOD OF COMMUNICATION FOR CIRCUIT SWITCHED SERVICE IN WIRELESS COMMUNICATION SYSTEM AND APPARATUS FOR THE SAME

(71) Applicant: LG ELECTRONICS INC., Seoul (KR)

(72) Inventors: Sung Hoon Jung, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 14/356,056

(22) PCT Filed: Nov. 1, 2012

(86) PCT No.: PCT/KR2012/009099
§ 371 (c)(1),
(2) Date: May 2, 2014

(87) PCT Pub. No.: WO2013/066060
PCT Pub. Date: May 10, 2013

(65) Prior Publication Data
US 2014/0314046 A1 Oct. 23, 2014

Related U.S. Application Data

(60) Provisional application No. 61/555,480, filed on Nov. 4, 2011.

(51) Int. Cl.
*H04W 36/16* (2009.01)
*H04W 36/14* (2009.01)
*H04W 36/00* (2009.01)

(52) U.S. Cl.
CPC ........ *H04W 36/165* (2013.01); *H04W 36/0022* (2013.01)

(58) Field of Classification Search
None
See application file for complete search history.

(56) References Cited

U.S. PATENT DOCUMENTS

2010/0113010 A1 5/2010 Tenny et al.
2010/0278142 A1 11/2010 Dwyer et al.
(Continued)

FOREIGN PATENT DOCUMENTS

WO 2011/100707 A1 8/2011
WO 2011/120030 A1 9/2011

OTHER PUBLICATIONS

3GPP TSG SA WG2 Meeting #7 TS S2-100550 (Jan. 18-22, 2010, Shenzhen, China).*
(Continued)

*Primary Examiner* — Ayaz Sheikh
*Assistant Examiner* — Tarell Hampton
(74) *Attorney, Agent, or Firm* — Birch, Stewart, Kolasch & Birch, LLP

(57) ABSTRACT

In an aspect, a method of communication performed by a user equipment (UE) camping on a long term evolution (LTE) cell in a wireless communication system is provided. The method include: receiving a Circuit Switched fallback (CSFB) control message from a network, the CSFB control message comprising prioritization information for CS service; determining whether the CS service is triggered; if it is determined that the CS service is triggered, applying a priority to frequencies of at least one cell in accordance with the priority information; performing a mobility procedure based on the applied priority; performing a Radio Resource Control (RRC) connection establishment procedure with a selected inter-RAT cell; and initiating the CS service.

14 Claims, 11 Drawing Sheets

(56) References Cited

U.S. PATENT DOCUMENTS

| | | | | |
|---|---|---|---|---|
| 2010/0279648 A1* | 11/2010 | Song | H04W 4/22 | 455/404.1 |
| 2010/0316000 A1* | 12/2010 | Burbidge | H04W 36/0022 | 370/328 |
| 2011/0053595 A1* | 3/2011 | Snow | H04W 76/028 | 455/436 |
| 2011/0059739 A1* | 3/2011 | Huang | H04W 48/18 | 455/435.1 |
| 2011/0170481 A1* | 7/2011 | Gomes | H04W 36/0083 | 370/328 |
| 2011/0176485 A1* | 7/2011 | Pudney | H04W 36/0022 | 370/328 |
| 2012/0015650 A1* | 1/2012 | Pudney | H04W 8/08 | 455/434 |
| 2012/0122458 A1* | 5/2012 | Jokinen | H04W 36/0061 | 455/437 |
| 2012/0127957 A1* | 5/2012 | Koskinen | H04W 36/0022 | 370/331 |
| 2013/0039301 A1* | 2/2013 | Nishida | H04W 36/14 | 370/329 |
| 2013/0150054 A1* | 6/2013 | Axmon | H04W 36/32 | 455/440 |
| 2013/0165120 A1* | 6/2013 | Nylander | H04W 8/08 | 455/436 |
| 2014/0235242 A1* | 8/2014 | Granzow | H04W 48/17 | 455/436 |

OTHER PUBLICATIONS

3GPP TS 23.272 V10.5.0 "3rd Generation Partnership Project; Technical Specification Group Services and System Aspects; Circuit Switched (CS) fallback in Evolved Packet System (EPS); Stage 2, (Release 10)", Sep. 2011.

* cited by examiner

METHOD OF COMMUNICATION FOR CIRCUIT SWITCHED SERVICE IN WIRELESS COMMUNICATION SYSTEM AND APPARATUS FOR THE SAME

This application is the National Phase of PCT/KR2012/009099 filed on Nov. 1, 2012, which claims priority under 35 U.S.C. 119(e) to U.S. Provisional Application No. 61/555,480 filed on Nov. 4, 2011, all of which are hereby expressly by reference into the present application.

TECHNICAL FIELD

The present invention relates to a wireless communication, and more particularly, to a method of communication for a circuit switched service in a wireless communication system and an apparatus for the same.

BACKGROUND ART $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A micro cell, a femto cell, and a pico cell, etc., having a small service area can be installed in a specific location of a macro cell having a wide coverage.

Due to mobility of a user equipment (UE) represented as a mobile device, quality of a currently provided service may deteriorate or a cell capable of providing a better service may be detected. Accordingly, the UE may move to a new cell, which is called performing of the mobility of the UE.

Circuit Switched fallback (CSFB) is a standardized solution that delivers voice and SMS over existing 2G/3G circuit switched network. The CSFB solution was widely supported by many operator as it requires minimum changes on legacy 2G/3G networks, and the CSFB is well suitable for the initial use cases of LTE network where LTE is used for data service only.

Upon a CS service being triggered, the CSFB requires the UE to make a Radio Resource Control (RRC) connection with LTE if the UE is in a RRC_IDLE state rather than directly selecting a cell of CS RAT while in RRC_IDLE state. These procedures occur unnecessary delay, then a quality of service may be deteriorated. Therefore, it is requested to suppose a method for communication allowing the UE to initiate the CS service more quickly.

SUMMARY OF INVENTION

Technical Problem

The present invention provides a method of communication for a CS service in a wireless communication system and an apparatus for the same.

Solution to Problem

In an aspect, a method of communication performed by a user equipment (UE) camping on a long term evolution (LTE) cell in a wireless communication system is provided. The method include: receiving a Circuit Switched fallback (CSFB) control message from a network, the CSFB control message comprising prioritization information for CS service; determining whether the CS service is triggered; if it is determined that the CS service is triggered, applying a priority to frequencies of at least one cell in accordance with the priority information; performing a mobility procedure based on the applied priority; performing a Radio Resource Control (RRC) connection establishment procedure with a selected inter-RAT cell; and initiating the CS service.

If the prioritization information for CS service indicates the UE is allowed to apply a prioritization of the at least one inter-RAT cell, the step of applying the priority may include applying the priority to at least one frequency of the at least one inter-RAT cell. The priority may be higher than any priority of frequency of the at least one LTE cell.

If the prioritization information for CS service indicates the UE is allowed to apply a de-prioritization of the at least one LTE cell, the step of applying the priority may include applying the priority to at least one frequency of the at least one LTE cell. The priority may be lower than any priority of frequency of the at least one inter-RAT cell.

The step of performing mobility may be based on the applied priority.

If the prioritization information for CS service may indicate that the UE is allowed to disable capabilities for LTE. The step of performing the mobility procedure based on the prioritization information may include: excluding any LTE cell for the mobility; and performing the mobility procedure with the at least one inter-RAT cell.

The CSFB information may further include a system information acquisition indicator. The method may further include acquiring system information from the at least one inter-RAT cell in response to the system information acquisition indicator.

The method may further include receiving a time gap configuration message indicating a time gap, the time gap being a time interval during which the UE is allowed to temporarily moves to the at least one inter-RAT cell. The step of acquiring system information may be performed within the time gap.

The step of performing the RRC connection establishment procedure may be based on the acquired system information.

The prioritization information may include information regarding a timer for a validity of the priority. The method may further include: starting the timer at the CS service being triggered; and when the timer is expired and the initiated CS service completes, performing the mobility procedure without the priority.

The method may further include: receiving a signaling message indicating that the priority is no longer applied; and performing the mobility procedure without the priority.

In another aspect a wireless apparatus operating in a wireless communication system is provided. The wireless apparatus include a radio frequency (RF) unit transmitting and receiving radio signals; and a processor operably coupled to the RF unit. The processor is configured to: receive a Circuit Switched fallback (CSFB) control message from a network, the CSFB control message comprising prioritization information for CS service; determine whether the CS service is triggered; if it is determined that the CS service is triggered, apply a priority to frequencies of at least one cell in accordance with the priority information; perform a mobility procedure based on the applied priority; perform a Radio Resource Control (RRC) connection establishment procedure with a selected inter-RAT cell; and initiate the CS service.

Advantageous Effects of Invention

According to the present invention, the UE is not forced to perform a RRC connection establishment procedure when a CS service is triggered. Furthermore, the UE can acquire and store system information of a cell(s) of CS RAT at a specific duration, e.g. paging duration, and use the stored system information for the RRC connection establishment procedure with the cell of CS RAT. Therefore, the delay introduced to initiate the CS service can be reduced compared to legacy CSFB mechanism where upon the CS service being triggered, the UE is first connected to LTE and then the UE is moved to a cell of CS RAT by connected mode mobility or idle mode mobility.

MODE FOR THE INVENTION

Figure 1:
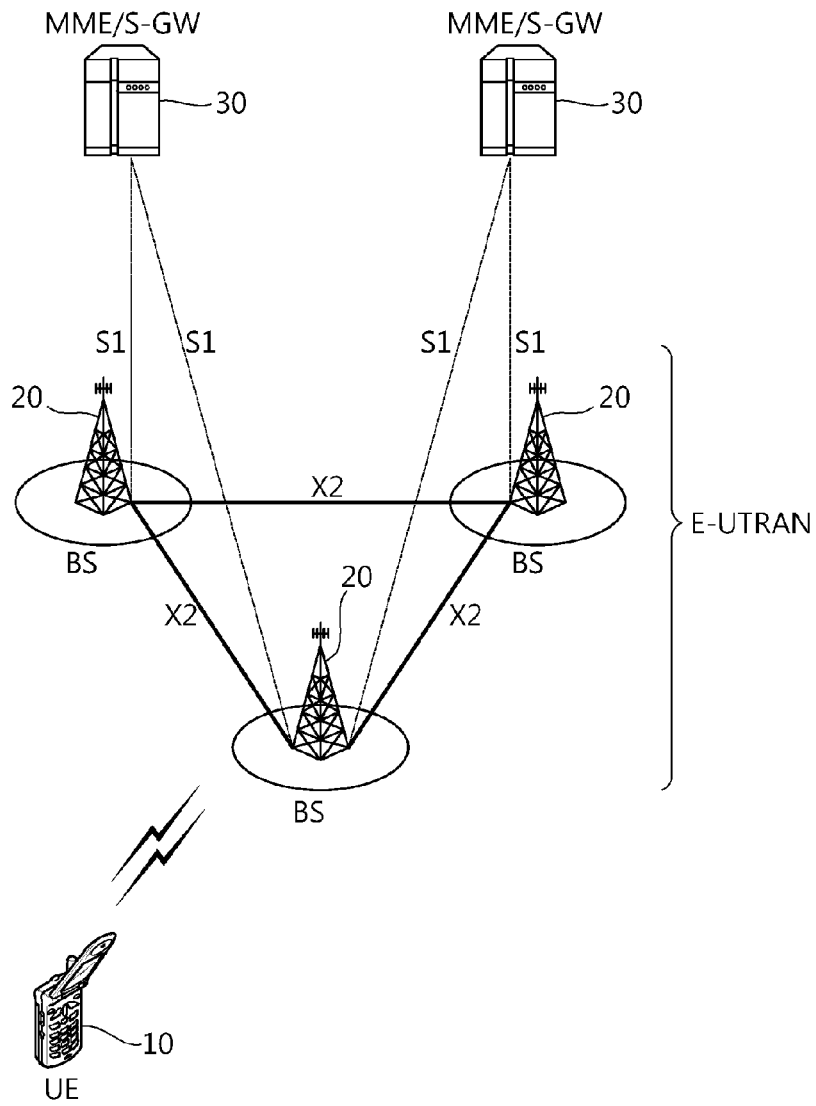
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
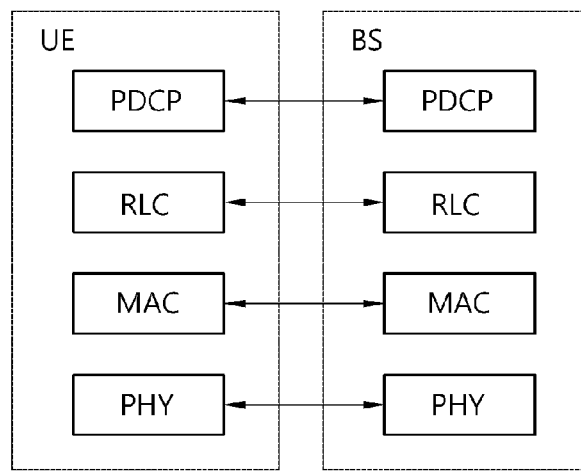
FIG. 2 is a diagram illustrating a radio protocol architecture for a user plane.
Figure 3:
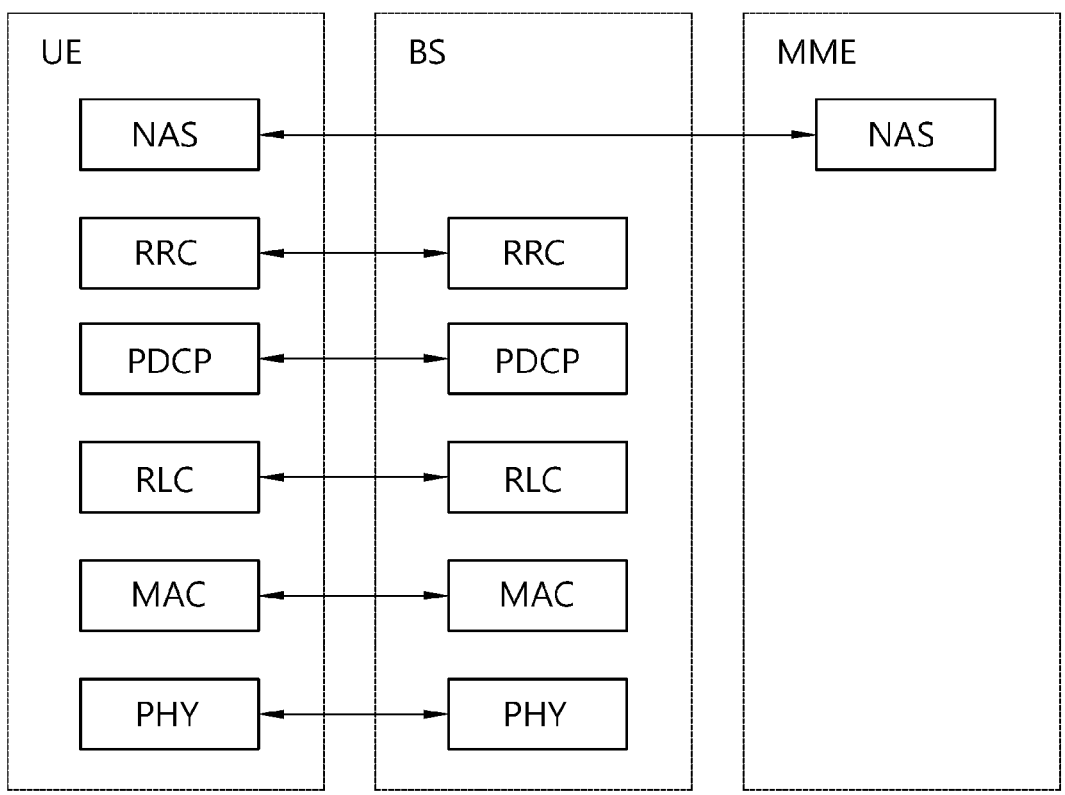
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each sub-frame may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one sub-frame.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
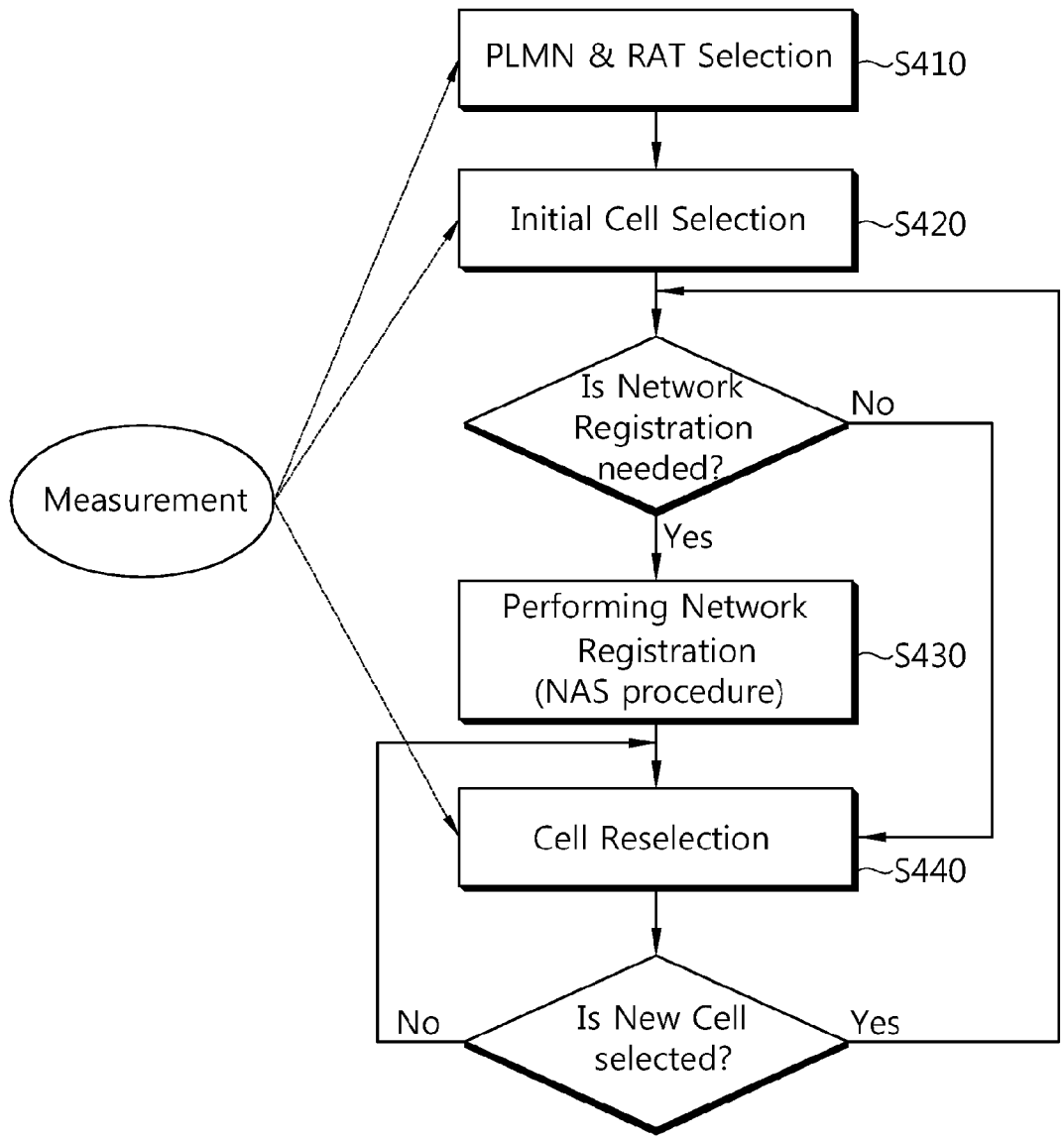
FIG. 4 is a flow chart illustrating an operation of a UE in an RRC idle state.

FIG. 4 is a flow chart illustrating an operation of a UE in an RRC idle state. Specifically, FIG. 4 shows a procedure in which a UE is registered to a network through a cell selection process when power of the UE is turned on, and a cell reselection is performed when necessary.

Referring to FIG. 4, the UE selects a radio access technology (RAT) for communicating with a PLMN (public land mobile network) as a network the UE wants to receive a service therefrom (S410). Information regarding the and RAT may be selected by a user of the UE, or that stored in a USIM (universal subscriber identity module) may be used.

The UE selects a cell having the greatest value among cells in which signal strength or quality thereof is greater than a particular value (S420). This is performed by a UE as power thereof is turned on, which may be called an initial cell selection. The cell selection procedure will be described later. After the cell selection, the UE receives system information periodically transmitted by a BS. The particular value refers to a value defined in the system in order to guarantee quality of a physical signal in data transmission and reception. Thus, it may vary according to an applied RAT.

When a network registration is required, the UE performs a network registration procedure (S430). In order to receive a service (e.g., paging) from the network, the UE registers its information (e.g., an IMSI). The UE is not registered to a network whenever a cell is selected, and registered to a network when information (e.g., tracking area identity (TAI) of a network received from the system information and information of a network the UE knows are different.

The UE performs cell reselection based on a service environment provided in a cell, a terminal environment, or the like (S440). When signal strength or quality value measured from a BS serving the UE is lower than a value measured from a BS of an adjacent cell, the UE selects one of cells providing better signal characteristics than that of the cell of the BS the UE has accessed. This process is called a cell reselection, discriminated from initial cell selection performed twice. Here, in order to prevent a cell is frequently re-selected according to a change in signal characteristics, a temporal constraint is provided. The cell reselection procedure will be described later.

Figure 5:
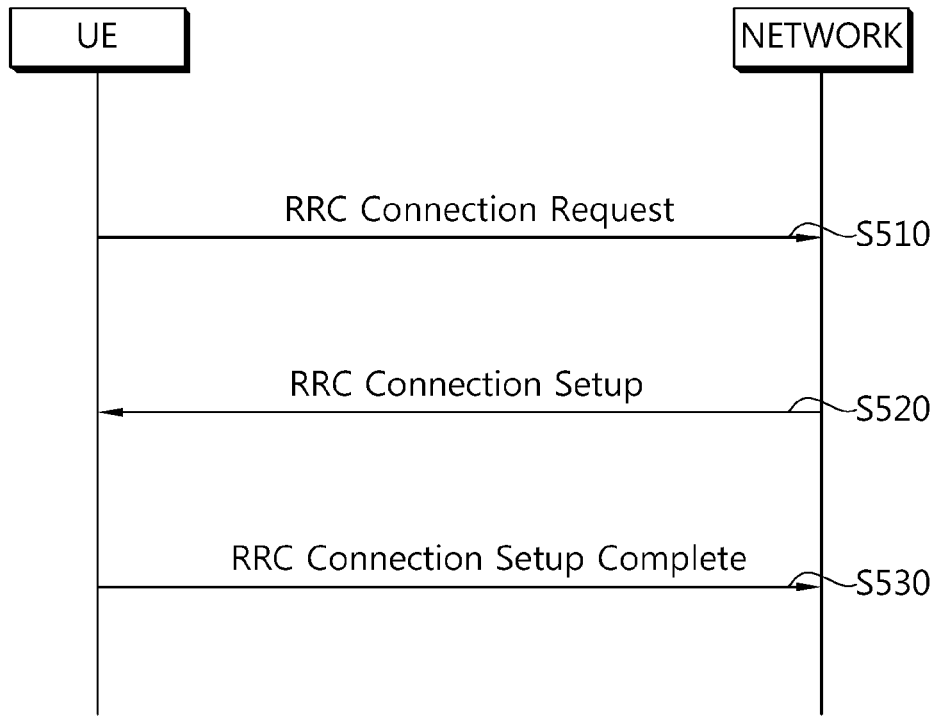
FIG. 5 is a flowchart showing an RRC connection establishment procedure.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

Figure 6:
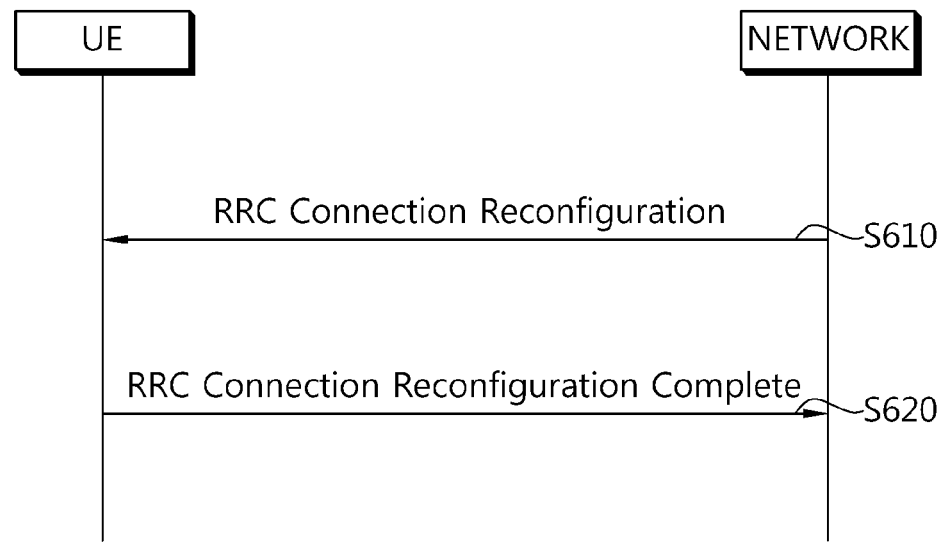
FIG. 6 is a flowchart showing an RRC connection reconfiguration procedure.

FIG. 6 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to be camped on a frequency having a highest priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$R_S = Q_{meas,s} + Q_{hyst}, \; R_n = Q_{meas,n} - Q_{offset} \qquad \text{[Math. 1]}$$

Herein, Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

Figure 7:
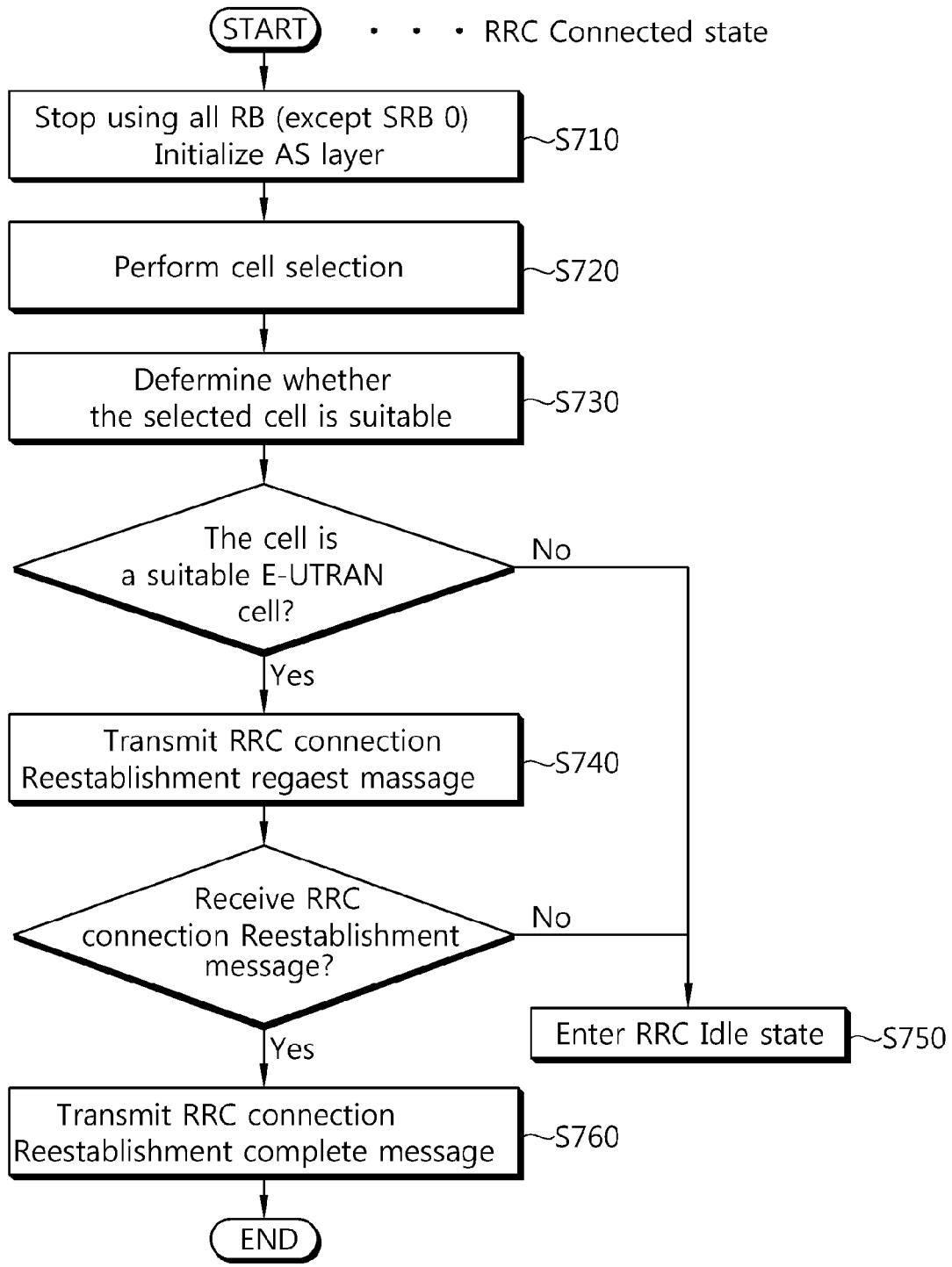
FIG. 7 is a flow chart illustrating an RRC connection re-establishment procedure.

FIG. 7 is a flow chart illustrating an RRC connection re-establishment procedure.

Referring to FIG. 7, a UE stops using of all the set radio bearers excluding SRB0 (Signaling Radio Bearer #0), and initializes various sub-layers of an Access Stratum (AS) (S710). Also, the UE sets each sub-layer and physical layer as a default configuration. During this process, the UE is maintained in an RRC connected state.

The UE performs a cell selection procedure to perform an RRC connection re-establishment procedure (S720). Although the UE is maintained in the RRC connected state, the cell selection procedure included in the RRC connection re-establishment procedure may be performed in the same manner as the cell selection procedure performed by the UE in an RRC idle state.

After performing the cell selection procedure, the UE checks system information of a corresponding cell to determine whether or not the corresponding cell is an appropriate cell (S730). When the selected cell is determined to be an appropriate E-UTRAN cell, the UE transmits an RRC connection reestablishment request message to the corresponding cell (S740).

Meanwhile, when it is determined that the cell selected through the cell selection procedure to perform an RRC connection re-establishment procedure is a cell that uses a different RAT other than the E-UTRAN, the RRC connection re-establishment procedure is stopped and the UE enters an RRC idle state (S750).

The UE may be implemented to finish checking appropriateness of a cell within a limited time through the cell selection procedure and reception of system information of a selected cell. To this end, the UE may drive a timer when an RRC connection re-establishment procedure starts. The timer may be stopped when the UE determines that an appropriate cell has been selected. When the timer expires, the UE may determine that the RRC connection reestablishment procedure has failed and enters an RRC idle state. The timer will be referred to as a radio link failure timer hereinafter. In the LTE specification TS 36.331, a timer named T311 may be utilized as a radio link failure timer. The UE may obtain a set value of the timer from system information of a serving cell.

When the cell receives an RRC connection re-establishment request message from the UE and accepts the request, the cell transmits an RRC connection re-establishment message to the UE.

Upon receiving the RRC connection reestablishment message from the cell, the UE reconfigures a PDCP sublayer and an RLC sublayer with respect to an SRB1. Also, the UE re-calculates various key values in relation to security setting, and re-configures a PDCP sublayer responsible for security with newly calculated security key values. Through this, the SRB1 between the UE and the CELL is open, and an RRC control message may be exchanged. The UE completes resuming of the SRB1, and transmits an RRC connection reestablishment complete message indicating that the RRC connection reestablishment procedure was completed to the cell (S760).

Meanwhile, upon receiving the RRC connection reestablishment request message, if the cell does not accept the request, the cell transmits an RRC connection re-establishment reject message to the UE.

When the RRC connection reestablishment procedure is successfully performed, the cell and the terminal performs an RRC connection reestablishment procedure. Through this, the UE may recover the state before the RRC connection re-establishment procedure was performed and continuity of a service is guaranteed to its maximum level.

Not, a network registration will be described.

A Public Land Mobile Network (PLMN) is a network deployed and operated by mobile network operator(s). Each mobile network operator runs one or more PLMNs. Each PLMN can be identified with the Mobile Country Code (MCC) and the Mobile Network Code (MNC). The PLMN information of a cell is broadcast in the system information.

For PLMN selection, cell selection, and cell reselection, several types of PLMNs are considered by UE.

Home PLMN (HPLMN): The PLMN whose MCC and the MNC matches the MCC and the MNC of the UE's IMSI.

Equivalent HPLMN (EHPLMN): Any PLMN that is equivalent to HPLMN.

Registered PLMN (RPLMN): The PLMN for which location registration is successful.

Equivalent PLMN (EPLMN): Any PLMN that is equivalent to RPLMN.

Each mobile service subscriber has a subscription with a HPLMN. When the normal service is provided to UE by the HPLMN or the EHPLMN, the UE is not in a roaming state. On the other hand, when the service is procided to UE by the PLMN other than HPLMN/EPHPLN, the UE is in a roaming state, and the PLMN is called Visited PLMN (VPLMN).

When UE is powered on, PLMN selection is triggered. For the selected PLMN, UE attempts to register the selected PLMN. If the registration is successful, the selected PLMN becomes RPLMN. Network can signal to the UE a list of PLMN for which the UE considers those PLMNs in the PLMN list equivalent to its RPLMN. The PLMN equivalent to RPLMN is called EPLMN. The UE that registered with network should be reachable by the network at any time. If the UE is in ECM-CONNECTED (equivalently RRC_CONNECTED), the network is aware of the cell the UE is being served. However, while the UE is in ECM-IDLE (equivalently RRC_IDLE), the context of the UE is not available at the eNB but stored in the MME. In this case, the location of the UE in ECM-IDLE is only known to the MME at the granularity of a list of Tracking Area (TA)s. A single TA is identified by the Tracking Area Identity (TAI) which consists of the PLMN Identity the tracking area belongs to and the Tracking Area Code (TAC) that uniquely represents the TA in the PLMN.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 8:
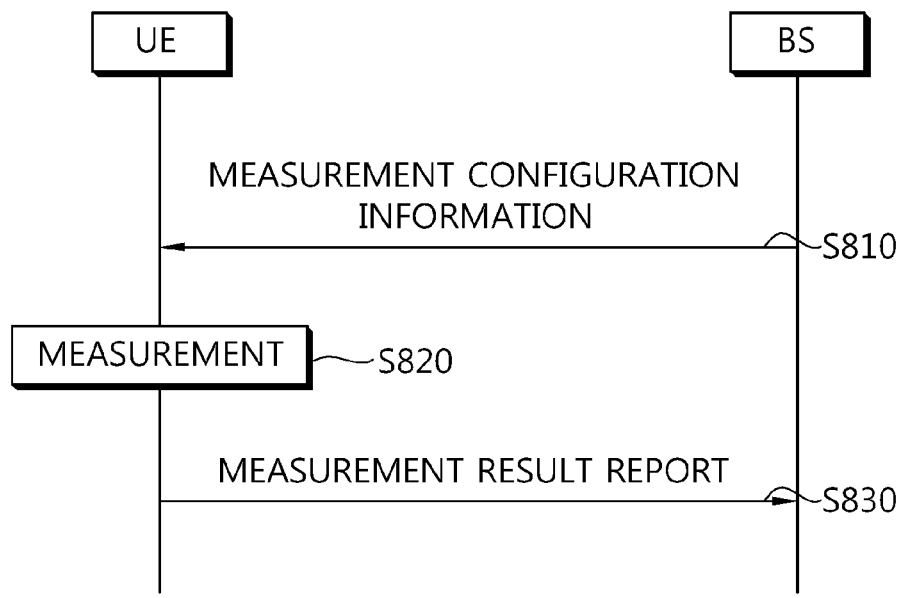
FIG. 8 is a flowchart showing a conventional method of performing measurement.

FIG. 8 is a flowchart showing a conventional method of performing measurement.

A UE receives measurement configuration information from a BS (step S810). A message including the measurement configuration information is referred to as a measurement configuration message. The UE performs measurement based on the measurement configuration information (step S820). If a measurement result satisfies a reporting condition included in the measurement configuration information, the UE reports the measurement result to the BS (step S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identity: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Events | Reporting Condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 9:
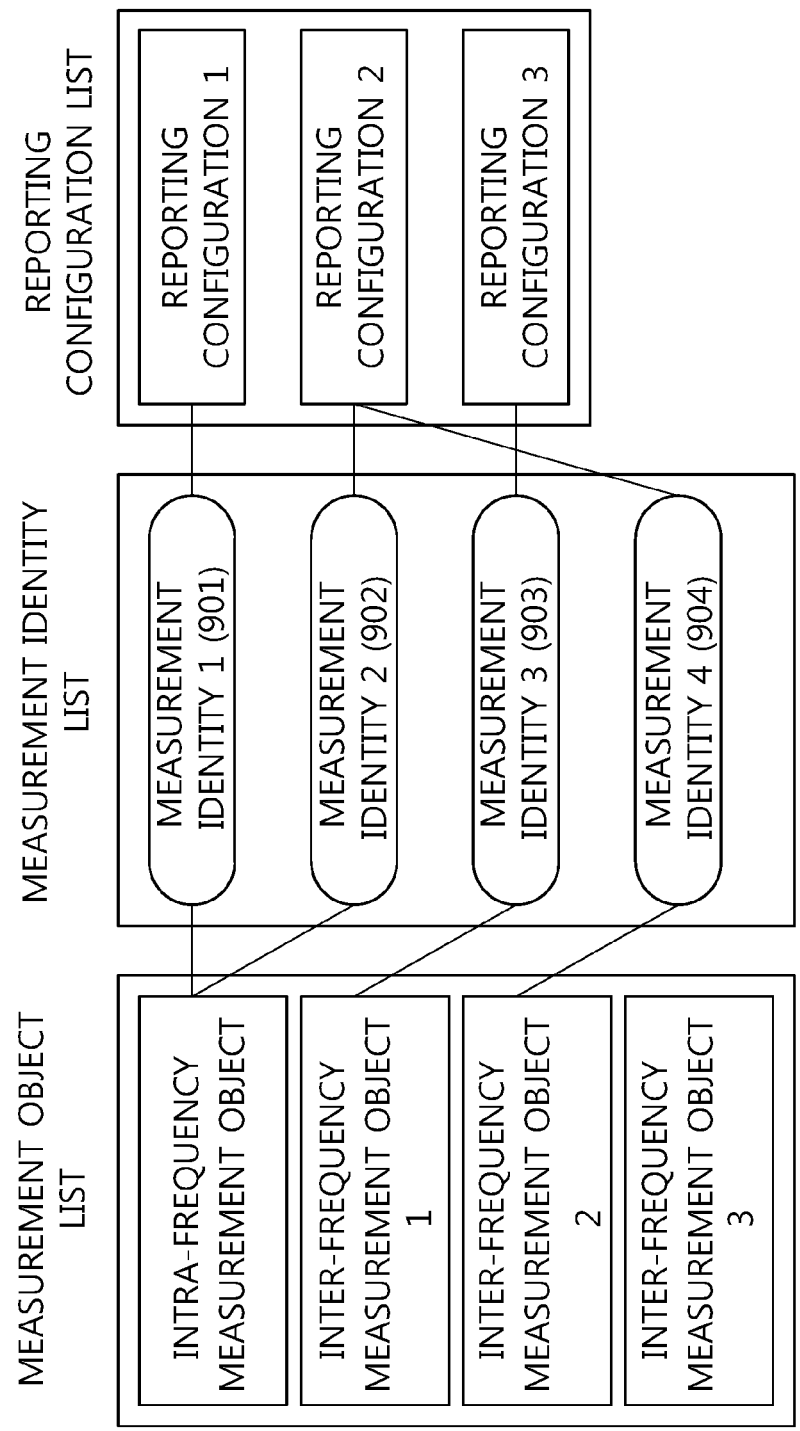
FIG. 9 shows an example of a measurement configuration assigned to a UE.

FIG. 9 shows an example of a measurement configuration assigned to a UE.

First, a measurement identity1 901 associates an intra-frequency measurement object with a reporting configuration 1. The UE performs intra-frequency measurement. The reporting configuration 1 is used to determine a reporting type and a criterion for reporting a measurement result.

A measurement identity2 902 is associated with the intra-frequency measurement object similarly to the measurement identifier1 901, and associates the intra-frequency measurement object with a reporting configuration 2. The UE performs intra-frequency measurement. The reporting configuration 2 is used to determine a reporting format and a criterion for reporting a measurement result.

By using the measurement identity1 901 and the measurement identity2 902, the UE transmits a measurement result even if the measurement result on the intra-frequency measurement object satisfies any one of the reporting configuration 1 and the reporting configuration 2.

A measurement identity3 903 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 904 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 10:
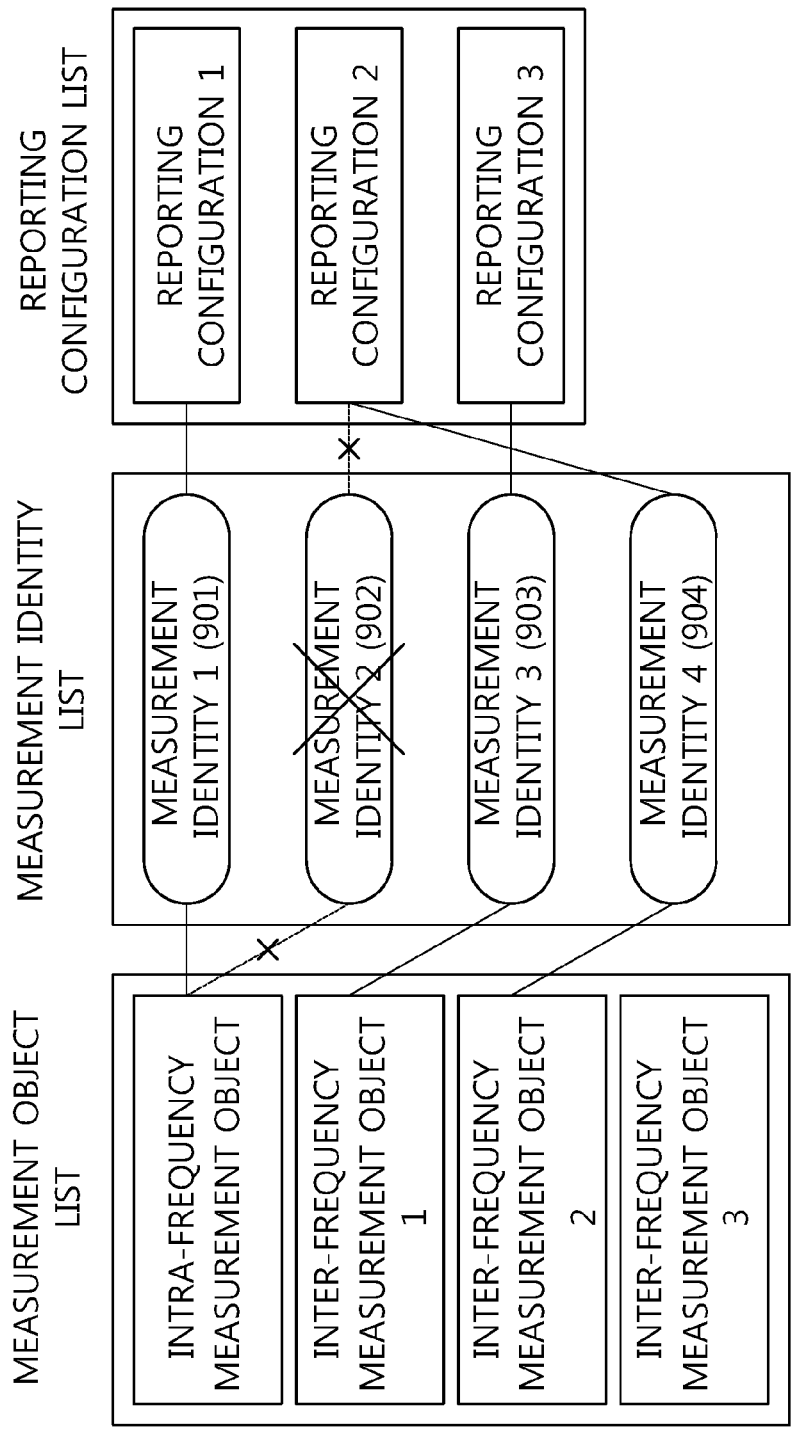
FIG. 10 shows an example of deleting a measurement identity.

FIG. 10 shows an example of deleting a measurement identity. When a measurement identity2 902 is deleted, measurement on a measurement object associated with the measurement identity2 902 is suspended, and a measurement report is not transmitted. A reporting configuration or a measurement object associated with the deleted measurement identity may not be modified.

Figure 11:
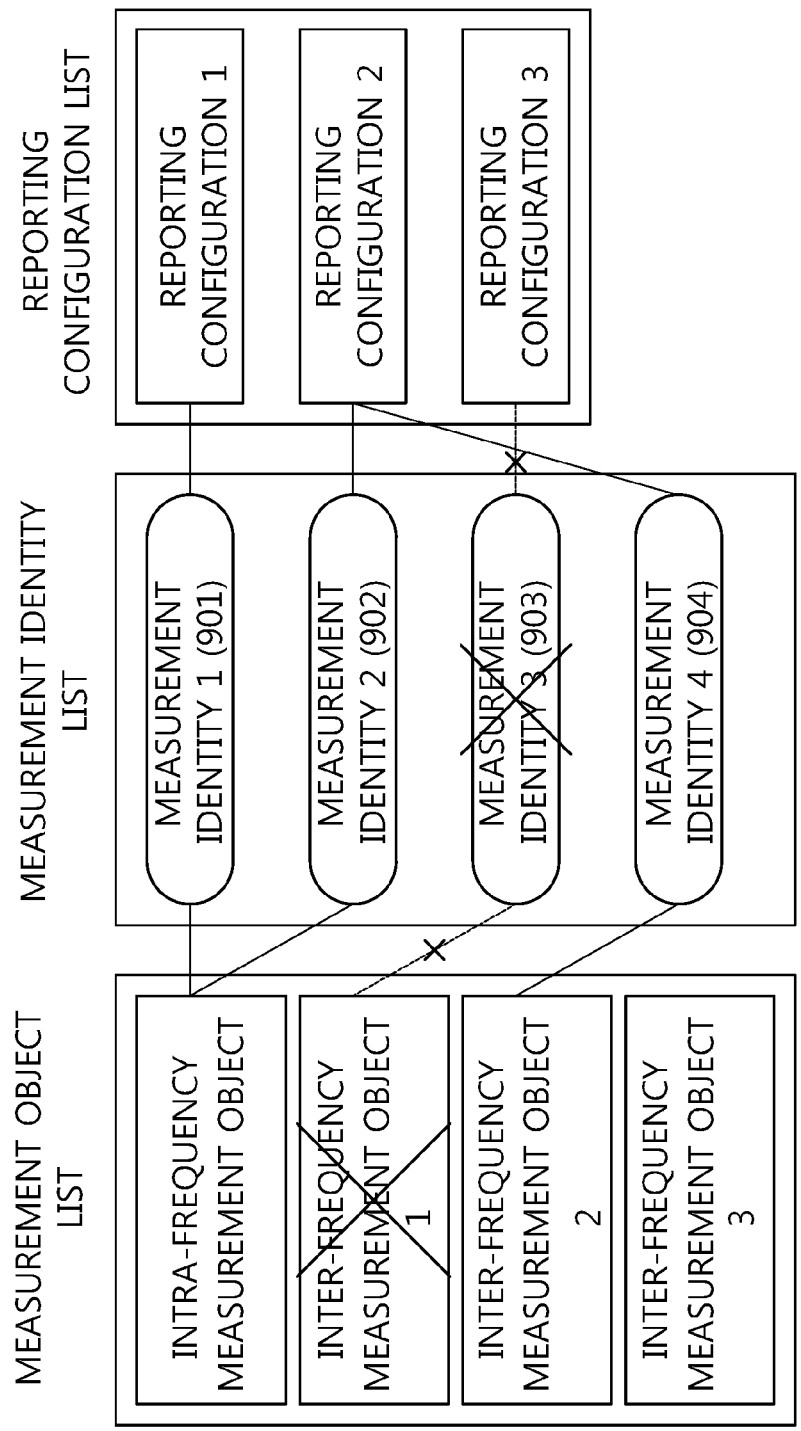
FIG. 11 shows an example of deleting a measurement object.

FIG. 11 shows an example of deleting a measurement object. When an inter-frequency measurement object 1 is deleted, a UE also deletes an associated measurement identifier3 903. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

Now, Circuit Switched fallback (CSFB) will be described.

The CSFB is the standardized solution that delivers voice and SMS over existing 2G/3G circuit switched network. The CSFB solution was widely supported by many operators as it requires minimum changes on legacy 2G/3G networks, and the CSFB is well suitable for the initial use cases of LTE network where LTE is used for data service only.

The CSFB is the mechanism, defined from 3GPP Release 8, to enable voice service by reusing existing circuit switched network for UEs camping on E-UTRAN for data services. If voice service is to be initiated, the UE is moved from LTE to legacy 2G/3G circuit switched (CS) network where CS voice call can be established. The CSFB is applicable to UE supporting LTE as baseline and CS access technologies, such as GERAN, UTRAN or CDMA 2000 1xRTT. From network point of view, the coverage of legacy CS network should overlay the E-UTRAN coverage such that a UE can be directed to one of available 2G/3G technologies when CSFB is initiated. The general architectural enhancement to enable the CSFB and relevant functionalities/procedures are specified in a standard.

In this specification, a term "CS RAT" is used for representing a specific RAT supporting a CS service, such as GERAN, UTRAN and/or CDMA 2000 1xRTT. And, a term "CS RAT cell" is used for representing a cell based on the CS RAT.

Figure 12:
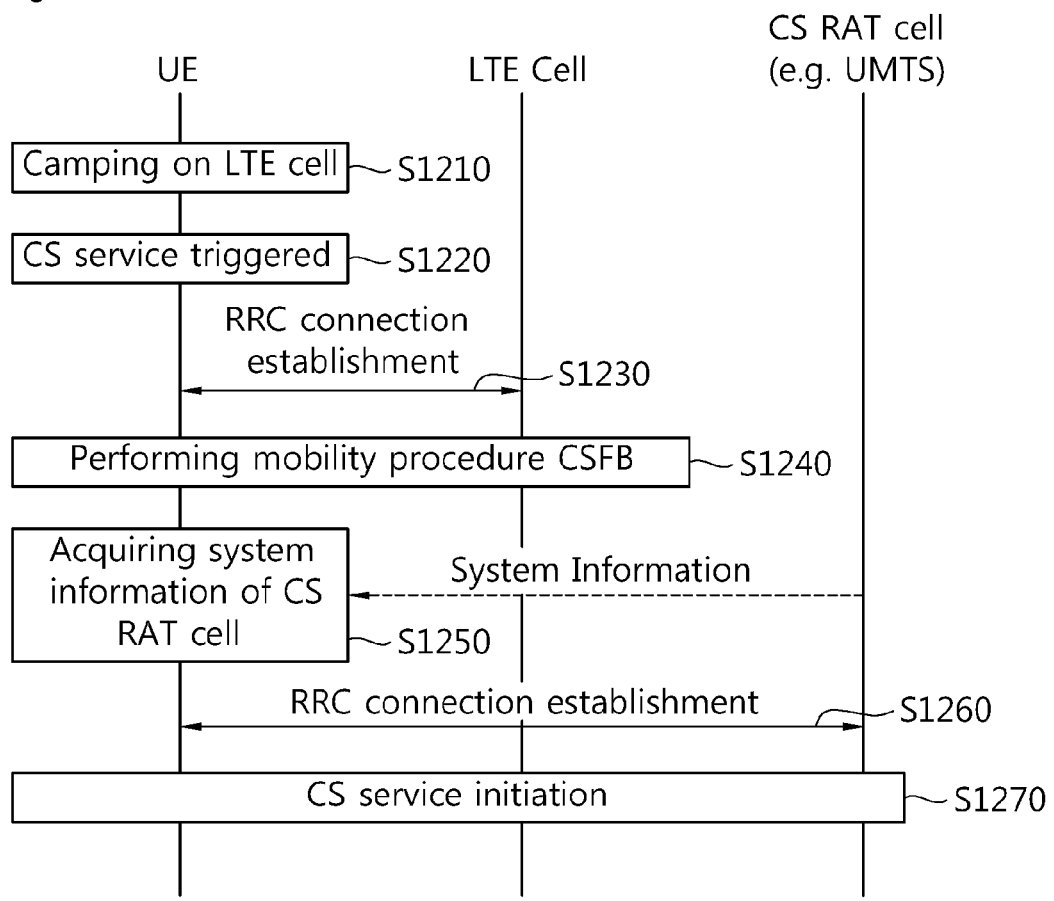
FIG. 12 is a flow chart showing an example of a communication method for CSFB.

FIG. 12 is a flow chart showing an example of a communication method for CSFB.

Referring FIG. 12, UE is camping on a LTE cell (step S1210).

A CS service is triggered (step S1220). The CS service that requires connection to CS network may be mobile an originated CS call, a mobile terminating CS call, an emergency call.

Upon CS service is triggered, it is requested that the UE make a RRC connection with the LTE cell. Therefore, the UE performs a RRC connection establishment procedure with the LTE cell (step S1230).

The CSFB is initiated by UE sending a particular NAS message called extended service request to MME. The extended service request may be sent in response to a paging message that was originated in CS domain and routed to E-UTRAN via MME in case of a mobile terminating call.

Upon receiving the extended service request for CSFB, the MME indicates the eNB to trigger relevant CSFB procedure. If eNB receives the CSFB indicator from MME, it performs CSFB by using an inter-RAT mobility procedure with the UE (step S1240).

The CSFB can be performed by network triggering inter-RAT mobility procedures. The inter-RAT mobility procedures applicable for CSFB include redirection, handover and cell change order:

- Redirection: Redirection procedure can be performed by eNB sending an RRC-ConnectionRelease message including redirection information. The redirection information indicates which RAT/frequency the UE needs to move to. Upon receiving redirection information, UE releases the RRC connection with E-UTRAN and performs cell selection to camp on a cell on the indicated RAT/frequency and makes a fresh RRC connection with the selected cell. Redirection procedure is applicable for CSFB to GERAN, UTRAN and CDMA2000 1xRTT.
- Handover: Handover to the other RAT is performed by eNB issuing mobility from the MobilityFromE-UTRACommand message as a handover command. The handover command includes the radio resource configurations to be used in target cell. If UE receives the handover command, UE release the RRC connection with E-UTRAN and accesses the target cell using the radio resource configuration included in the handover command. Handover to the other RAT using mobility from E-UTRA procedure is applicable for CSFB to GERAN, UTRAN and CDMA2000 1xRTT. If the MobilityFromE-UTRACommand message is sent for CSFB to GERAN or UTRAN, it includes CSFB indicator for the use in case of handover failure in NAS.
- Cell change order: Cell Change Order (CCO) can be also used for CSFB. CCO is applicable for only CSFB to GERAN.

The UE acquires system information from the CS RAT cell for an RRC connection establishment procedure (step S1250).

The UE performs a RRC connection establishment procedure with the CS RAT cell based on the acquired at step S1250 (step S1260), and initiate CS service (step S1270).

Note that the RRC connection in E-UTRAN is released after the CSFB. This means that, while UE is provided with voice call enabled by the CSFB in the redirected RAT, the data service can be degraded, or even suspended. After voice call ends, it is desirable for UE to revert toward E-UTRAN for further data services. The return to E-UTRAN is done by network control, i.e. no UE autonomous action is defined for that.

Since voice is delivered over CS domain with CSFB, the UE should be first attached to both EPC and CS domain in 3G/2G networks to enable CSFB. The registration to both EPS and CS domain is efficiently done with a 'combined' procedure for registration, rather than performing two registration procedures independently. The combined registration can be applied to attach procedure and location area update procedure in the NAS layer.

Regarding the combined registration, the mapping between tracking area and location/routing is managed in MME, which enables MME to trigger CSFB towards the proper cell of CS network.

Upon CS service being triggered, the CS fallback requires UE to make a RRC connection with LTE if the UE is now in RRC_IDLE state rather than directly selecting a cell of CS RAT while in RRC_IDLE. This introduces unnecessary delay, and this delay may degrade the quality of service of the CS service. Rapid CS network selection mechanism that allows the UE to initiate CS service more quickly will be beneficial. In below, a communication method based on the rapid CS network selection mechanism will be described.

In this invention, for applying a prioritization to a LTE cell and/or a cell of CS RAT and accelerating a RRC connection establishment, an additional signaling message is transmitted from a network to a UE. The signaling message may be called a CSFB control message.

Figure 13:
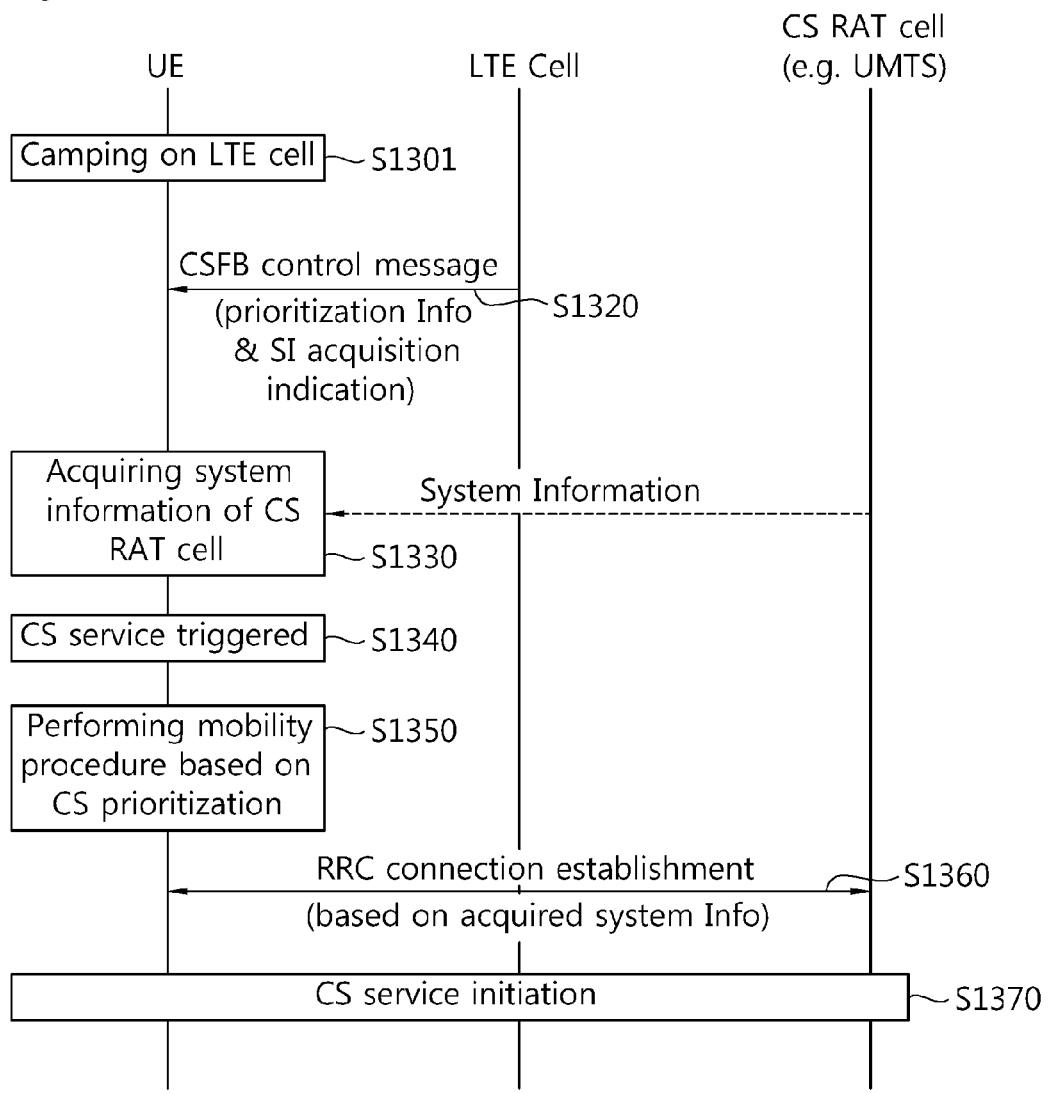
FIG. 13 is a flow chart showing an example of a communication method according to an embodiment of the present invention.

FIG. 13 is a flow chart showing an example of a communication method according to an embodiment of the present invention.

Referring FIG. 13, UE is camping on LTE cell (step S1310).

The UE receives a CSFB control message from network (step S1320). The CSFB control message may be transmitted for configuring whether the UE is allowed to apply a prioritization to a cell(s) of CS RAT and/or a LTE cell(s). The conceptual scope of the prioritization includes both applying higher prioritization and applying lower prioritization to a cell(s) of a specific RAT. In below, the application of higher priority is called as a prioritization, and the application of lower priority is called as a de-prioritization.

The CSFB control may be transmitted for configuring whether the UE is allowed to acquire and store system information of a cell(s) of CS RAT for accelerating the RRC connection establishment procedure.

The CSFB control message may be transmitted through AS or NAS signaling. When the CSFB control message is transmitted through AS signaling, the message may be a RRC message and be transmitted by broadcast signaling or dedicated signaling. The CSFB control message is transmitted through NAS signaling. When the CSFB control message is transmitted through NAS signaling, the message may be Tracking Area Update accept message or Attach accept message.

The CSFB control message may include prioritization information and system information acquisition information. The prioritization information may indicate that the UE applies a specific priority for inter-RAT mobility. The system information acquisition information may indicate a mechanism for acquiring system information of the CS RAT. The system information acquisition information may be provided for accelerating the connection establishment on overlaid cell of CS RAT (e.g. UMTS)

The UE acquiring system information of CS RAT cell based on the system information acquisition information (step S1330). The UE camped on the LTE cell may be allowed to acquire the system information inter-RAT cell, when the UE has received the additional signaling message, such as the CSFB control message. The UE attempts to acquire system information of the cell of CS RAT, and stores the system information together with identification information of the cell of CS RAT. When the UE makes a connection with the cell of CS RAT, if the UE has a valid system information of the CS RAT, then the UE applies the stored system information, by which the UE can skip the reading of system information from the cell of CS RAT just prior to making the connection.

The following mechanism may be used by the UE connected to/camping on LTE cell, in order to acquire the system information of the cell of CS RAT to accelerate the RRC connection establishment on overlaid cell of CS RAT:

1) While not releasing the connection with the LTE cell, the UE temporarily moves from LTE cell to cell of CS RAT to enable the UE to read the system information on the cell of the CS RAT, where the system information is required to camp on the cell of the CS RAT and to make a connection with the cell of the CS RAT. If the UE determines that the cell of the CS RAT is suitable to camp on, then the UE stores the required system information of the cell of the CS RAT for later use. The UE can store system information of multiple cells of the CS RAT up to pre-determined number For this, the serving cell may configure to the UE a time gap for which the UE is allowed to read system information of cell of CS RAT. The time gap may be configured to the UE in RRC_CONNECTED state through a RRC signaling message. The time gap may be configured to the UE in RRC_IDLE state by system information. Information regarding the time gap may be included in the system information acquisition information of the CSFB control message The time gap may be configured within a non-paging interval. The time gap may be configured as a specific time interval or a pattern of a plurality of time intervals.

If this time gap is configured, the UE is allowed to ignore monitoring of LTE control channel during the gap, and during the gap the UE attempts to read the system information of the cell of CS RAT. The cell of the CS RAT for which the UE is required to read system information may be indicated by serving LTE cell. The UE may be requested to report the system information of the cell of the CS RAT that is acquired by the UE.

The UE applies the following operation regarding the reading of system information of cell of CS RAT and management of the stored system information of the cell of CS RAT.

The UE attempts to read the system information of the cell of CS RAT with the principle that the cell of the frequency having higher priority is first read among multiple frequencies of CS RAT. The serving LTE cell may indicate the priorities of UMTS frequencies UE first attempts to read.

The UE attempts to read the system information of the cell of CS RAT with the principle that the best ranked cell is read first on the concerned frequency of the CS RAT.

The UE attempts to read the system information of the cell of CS RAT at non-paging occasions for the UEs.

The UE may periodically read the system information of the cell of CS RAT to update its stored system information by newer version of system information.

2) The LTE cell broadcasts the system information of the overlaid cell of CS RAT. The UE camping on LTE cell is ready for CS service on cell of CS RAT, and tries to update the system information of the overlaid cell of CS RAT by reading the broadcast information of the cell of CS RAT from the LTE cell.

The acquired and stored system information of the cell of CS RAT can be considered valid for a pre-determined time or configured time.

To manage the stored system information of the cell of CS RAT, the UE attempts to perform validity check regarding whether the stored system information of the cell of CS RAT is up to date. To facilitate the check, the LTE cell may provide a value tag(s) of system information of the cell(s) of overlaid CS RAT together with the cell identification information of the cell(s) of the CS RAT. If UE reads the value tag of a cell of CS RAT from the LTE cell during the validity check, the UE compares the value tag with the stored value tag associated with the stored cell identification information that corresponds to the concerned cell of CS RAT.

Referring back to FIG. 13, the CS service is triggered (step S1340).

The service that requires connection to CS network may be mobile an originated CS call, a mobile terminating CS call, or an emergency call.

The UE may determine that the service that requires connection to CS network is triggered if the Service Request or Extended Service Request that requires CSFB is triggered at NAS layer.

The UE may determine that the service that requires connection to CS network is triggered if the Service Request or Extended Service Request that requires connection to CS-supporting RAT for the service is triggered at NAS layer.

The UE may determine that the service that requires connection to CS network is triggered if it receives paging message or paging indication which indicate that Core Network (CN) domain that is supposed to service is CS network.

Upon CS service is triggered, the UE performs mobility procedure in basis of CS prioritization (step S1350). The mobility procedure may be performed by the UE as following.

1) When the UE is in RRC_IDLE state, the UE performs cell reselection to CS RAT (e.g. UMTS) by considering reselection priorities of the frequencies of CS RAT to be RAT to be of the higher than any of priorities of LTE frequencies. That is, the UE may perform a cell reselection by using the prioritization of the cell(s) of CS RAT. For example, the reselection priorities of the frequencies of CS RAT are set to the highest priority.

2) When the UE is in RRC_IDLE state, the UE performs cell reselection to CS RAT (e.g. UMTS) by considering reselection priorities of LTE frequencies to be of the lower than those of any CS RAT frequencies. That is, the UE may perform a cell reselection by using the de-prioritization of the LTE cell(s). For example, the reselection priorities of the LTE frequencies are set to the lowest priority.

3) The UE disables LTE capability such that the LTE frequency is not considered as reselection. Then, the UE may perform cell reselection and/or handover with the cell of CS RAT.

4) When the UE is in RRC_CONNECTED state, the UE releases the RRC connection with the LTE cell Upon selecting the target cell of CS RAT, the UE performs a RRC connection establishment procedure (step S1360). If the UE already has a valid stored system information of the cell of CS RAT, the UE is allowed to skip reading system information, and the RRC connection establishment procedure is performed based on the system information.

After the RRC connection is established, the UE initiate CS service (step S1370).

Meanwhile, the prioritization of the cell of CS RAT and the de-prioritization of the LTE cell are temporarily applied and would be desirably terminated after the CS service completes. In other words, the duration of the prioritization/de-prioritization and the enabling of the LTE capabilities can be limited. So that, after the duration of prioritization/de-prioritization for cell reselection capability or the duration of disabling of LTE capabilities is expired, the UE is supposed to move to the LTE cell to camp on. To put such limitation, following mechanism may be applied.

1) Time based: The prioritization/de-prioritization and/or the disabling of the LTE capabilities is applied only while a specific timer is running. If the timer is suspended, the UE reverts to using original priorities for the frequencies of CS RAT (such as UMTS) and the LTE frequencies for cell reselection or the UE enables the LTE capabilities.

The timer is started when the UE starts to apply the prioritization/de-prioritization and/or the disabling of the LTE capabilities upon CS service triggered. The value of the timer is predetermined value or can be signaled by network, e.g., LTE network. Information regarding the timer may be included in the prioritization information of the CSFB control message.

2) Network indication: The serving network commands the UE to stop applying the prioritization/de-prioritization and/or the disabling of the LTE capabilities. The serving network may be LTE of CS RAT. This command may be sent to UE via RRC signaling.

3) Service duration of the concerned CS service: The UE stops applying the prioritization/de-prioritization and/or the disabling of the LTE capabilities if the CS service which was enabled by those completes.

4) The UE state on the CS network to which the UE moved for the concerned CS service: The UE stops applying the prioritization/de-prioritization and/or the disabling of the LTE capabilities if the UE enters RRC_IDLE on the CS network.

In the present invention, the UE may register both EPS and CS network while connected to LTE network.

According to the present invention, the delay introduced to initiate the CS service can be reduced compared to legacy CSFB mechanism where upon CS service being triggered, the UE is first connected to LTE and then the UE is moved to a cell of CS RAT by connected mode mobility or idel mode mobility.

Figure 14:
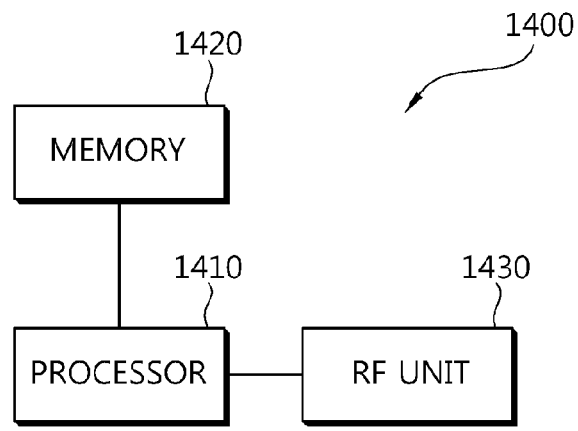
FIG. 14 is a block diagram showing a wireless apparatus according to an embodiment of the present invention.

FIG. 14 is a block diagram showing a wireless apparatus according to an embodiment of the present invention. The apparatus implements an operation of a UE according to the embodiments of FIG. 13

A wireless apparatus 1400 includes a processor 1410, a memory 1420, and a radio frequency (RF) unit 1430. The processor 1410 implements the proposed functions, procedures, and/or methods. The processor 1410 may be configured to receive a CSFB control message from network. The processor 1410 is configured to acquire system information of a cell(s) of CS RAT and store the acquired system information in accordance with the CSFB control message. The processor 1410 is configured to apply a prioritization of the cell of CS RAT and/or a de-prioritization of a LTE cell in accordance with the CSFB control message. The processor 1410 is configured to disable LTE capabilities in accordance with the CSFB control message. The processor 1410 is configured to perfume mobility procedure based on the prioritization/de-prioritization and/or disabling the LTE capabilities. The embodiments of FIG. 13 can be implemented by the processor 1410 and the memory 1420.

The RF unit 1430 coupled to the processor 1410 transmits and receives a radio signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method of communication performed by a user equipment (UE) camping on a long term evolution (LTE) cell in a wireless communication system, the method comprising:
receiving a circuit switched fallback (CSFB) control message from a network, the CSFB control message comprising prioritization information for circuit switched (CS) service and a system information acquisition indicator;
receiving a time gap configuration message indicating a time gap, the time gap being a time interval during which the UE is allowed to temporarily move from the LTE cell to at least one inter-radio access technology (RAT) cell;

acquiring system information from the at least one inter-RAT cell in response to the system information acquisition indicator within the time gap;

determining whether the CS service is triggered;

if it is determined that the CS service is triggered, applying a priority to frequencies of the at least one inter-RAT cell in accordance with the priority information;

performing a mobility procedure based on the applied priority;

performing a radio resource control (RRC) connection establishment procedure with a selected inter-RAT cell; and initiating the CS service.

2. The method of claim 1, wherein if the prioritization information for CS service indicates the UE is allowed to apply a prioritization of the at least one inter-RAT cell, the applying the priority comprises applying the priority to at least one frequency of the at least one inter-RAT cell, and wherein the priority is higher than any priority of frequency of the at least one inter-RAT cell.

3. The method of claim 2, wherein if the prioritization information for CS service indicates the UE is allowed to apply a de-prioritization of the at least one inter-RAT cell, the applying the priority comprises applying the priority to at least one frequency of the at least one inter-RAT cell, and wherein the priority is lower than any priority of frequency of the at least one inter-RAT cell.

4. The method of claim 1, wherein if the prioritization information for CS service indicates that the UE is allowed to disable capabilities for LTE, and wherein the performing the mobility procedure comprises:

excluding use of any LTE cell for the mobility procedure; and performing the mobility procedure with the at least one inter-RAT cell.

5. The method of claim 1, wherein the performing the RRC connection establishment procedure is based on the acquired system information.

6. The method of claim 1, wherein the prioritization information comprises information regarding a timer for a validity of the priority, and wherein the method further comprises:

starting the timer at the CS service being triggered; and when the timer is expired and the initiated CS service completes, performing the mobility procedure without the priority.

7. The method of claim 1, further comprising:

receiving a signaling message indicating that the priority is no longer applied; and performing the mobility procedure without the priority.

8. A wireless apparatus operating in a wireless communication system, the wireless apparatus comprising:

a radio frequency (RF) unit configured to transmit and receive radio signals; and a processor operably coupled to the RF unit, wherein the processor is configured to:

receive a circuit switched fallback (CSFB) control message from a network, the CSFB control message comprising prioritization information for circuit switched (CS) service and a system information acquisition indicator, receive a time gap configuration message indicating a time gap, the time gap being a time interval during which the wireless apparatus is allowed to temporarily move from a long term evolution (LTE) cell on which the wireless apparatus is camped to at least one inter-radio access technology (RAT) cell, acquire system information from the at least one inter-RAT cell in response to the system information acquisition indicator within the time gap, determine whether the CS service is triggered, if it is determined that the CS service is triggered, apply a priority to frequencies of the at least one inter-RAT cell in accordance with the priority information, perform a mobility procedure based on the applied priority, perform a radio resource control (RRC) connection establishment procedure with a selected inter-RAT cell, and initiate the CS service.

9. The wireless apparatus of claim 8, wherein if the prioritization information for CS service indicates the wireless apparatus is allowed to apply a prioritization of the at least one inter-RAT cell, the priority is applied to at least one frequency of the at least one inter-RAT cell, and wherein the priority is higher than any priority of frequency of the at least one inter-RAT cell.

10. The wireless apparatus of claim 9, wherein if the prioritization information for CS service indicates the wireless apparatus is allowed to apply a de-prioritization of the at least one inter-RAT cell, the priority is applied to at least one frequency of the at least one inter-RAT cell, and wherein the priority is lower than any priority of frequency of the at least one inter-RAT cell.

11. The wireless apparatus of claim 8, wherein if the prioritization information for CS service indicates that the wireless apparatus is allowed to disable capabilities for LTE, the mobility procedure is performed by excluding use of any LTE cell for the mobility procedure, and the at least one inter-RAT cell.

12. The wireless apparatus of claim 8, wherein the RRC connection establishment procedure is performed based on the acquired system information.

13. The wireless apparatus of claim 8, wherein the prioritization information comprises information regarding a timer for a validity of the priority, and wherein the processor is further configured to:

start the timer at the CS service being triggered; and when the timer is expired and the initiated CS service completes, perform the mobility procedure without the priority.

14. The wireless apparatus of claim 8, wherein the processor is further configured to:

receive a signaling message indicating that the priority is no longer applied, and perform the mobility procedure without the priority.

* * * * *